United States Patent
O'Callaghan et al.

[11] 3,906,327
[45] Sept. 16, 1975

[54] CONTROLLED VELOCITY DRIVE

[75] Inventors: Gerald F. O'Callaghan, Kenosha; Donald D. Woelz, Milwaukee, both of Wis.

[73] Assignee: Eaton Corporation, Cleveland, Ohio

[22] Filed: Aug. 28, 1973

[21] Appl. No.: 392,406

[52] U.S. Cl. ............... 318/603; 318/606; 318/625
[51] Int. Cl.² ......................................... G05B 19/28
[58] Field of Search ........... 318/603, 314, 606, 625, 318/6

[56] References Cited
UNITED STATES PATENTS

| | | | |
|---|---|---|---|
| 3,460,012 | 8/1969 | Henegar et al. .................... | 318/603 |
| 3,462,663 | 8/1969 | Schiller ............................... | 318/606 |
| 3,515,961 | 6/1970 | Allen, Jr. ........................... | 318/603 X |
| 3,582,541 | 6/1971 | Hebb .................................. | 318/314 X |
| 3,588,660 | 6/1971 | Purkhiser ........................... | 318/625 X |
| 3,602,700 | 8/1971 | Jerva ................................... | 318/603 X |
| 3,629,633 | 12/1971 | Callaghan ........................... | 318/6 X |

*Primary Examiner*—Benjamin Dobeck
*Attorney, Agent, or Firm*—Teagno & Toddy

[57] ABSTRACT

A control for a plurality of drives each of which includes a driven load associated therewith includes a reference generator for generating a pulse train wherein each pulse is indicative of a desired incremental movement of the load and the frequency of the pulses is indicative of a desired velocity of the load, a plurality of sensing means each of which is associated with one of the drives for generating a feedback pulse train wherein each pulse is indicative of an actual incremental movement of its associated load and the frequency of the pulses is indicative of the actual velocity of its associated load and a plurality of digital summers each of which is associated with one of the drives for summing pulses of the reference pulse train and the feedback pulse train and establishing a positional error signal. A velocity control means is provided responsive to the error signal for driving the associated load at substantially the desired velocity. The control further includes a plurality of second sensing means each of which is associated with one of the loads for sensing an actual position of the associated load and establishing a signal indicative of the actual position of the associated load, synchronizing means responsive to each of the actual position signals for determining the relative position of one of the loads relative to another of the loads and phase jogging means responsive to the synchronizing means for incrementally shifting the phase of one of the loads relative to another of the loads to bring the one load into phase with the other load. The phase jogging means may also be operated independently of the synchronizing means to establish a phase relationship which is not necessarily limited to an in-phase relationship between the one and the other associated load. Thus, the present control system is operable to velocity lock a plurality of drives together and hold the driven members of the drives in a predetermined variable phase relationship.

62 Claims, 5 Drawing Figures

FIG.2 FORWARD PHASE JOG CIRCUIT

ONE LINE DIAGRAM POSITION SYNC. LOGIC

CONTROLLED VELOCITY DRIVE

BACKGROUND OF THE INVENTION

The present invention relates to a control for a plurality of controlled velocity drives and more specifically to a control for a plurality of controlled velocity drives wherein the control is operable to maintain the velocity and phase of each of the drives in a predetermined relationship relative to the phase and velocity of another of the plurality of drives.

Means for controlling the phase and velocity of a drive relative to a reference signal are known. Such means are disclosed in the O'Callaghan and Woelz application Ser. No. 240,221 filed Mar. 31, 1972, and assigned to the assignee of the present invention, and which application is hereby incorporated by reference in the present application.

Other systems are known for synchronizing a plurality of drives. One such system is disclosed in the Hebb U.S. Pat. No. 3,582,541, which discloses a coincidence Servo-System for use in synchronizing magnetic tape transports with each other or a related reference. The Hebb patent discloses a pulse add or subtract circuit which adds or subtracts pulses until an in-phase relationship is established. Hebb does not act to measure the phase difference between the drives as is disclosed in the present invention. Hebb merely adds or subtracts pulses until coincidence is sensed. The problem with the known controls of velocity drives is that their overall performance leaves something to be desired. Specifically, the accuracy of the set point stability for generating a reference signal and the temperature stability of analog systems could be improved.

The present invention relates to a control system for a controlled velocity drive which includes both analog and digital controls. This enables the accuracy of a digital system to be combined with the dynamic stability of an analog system while maintaining response times. The drives of the present invention include a driven load or a plurality of driven loads wherein a reference pulse train is generated to control the velocity of the load and the average error in velocity of the load for a given time period is zero. The system includes means for generating the reference pulse train wherein each incremental pulse is indicative of a desired incremental movement of the load and the frequency of the reference pulses is indicative of a desired velocity of the load and sensing means for sensing the actual incremental movement and velocity of the load and establishing a second pulse train wherein each incremental pulse is indicative of an actual incremental movement of the load and the frequency of the pulses is indicative of the actual velocity of the load. Digital summing means is provided for summing pulses of the reference pulse train and pulses of the second pulse train for generating a position error signal indicative of the positional error between the actual incremental movement of the load and the desired incremental movement of the load. A velocity control means is provided responsive to the error signal for varying the velocity of the load to drive the load substantially at the desired velocity. Means are provided for blocking the application of a pulse to the digital summing means from one of the pulse trains. The blocking means by blocking pulses from one of the pulse trains to the digital summing means acts to control the phase relationship between the actual position of the load as indicated by the second pulse train and the desired position of the load as indicated by the reference pulse train. Moreover, if a plurality of driven loads are utilized with the present control system the blocking means can control the phase relationship between any one of the loads relative to another of the loads.

The blocking means generally takes the form of a phase jogging circuit which provides a means for incrementally shifting the phase of a drive member. The shift can be bi-directional with the minimum shift increment set by the resolution of the feedback transducer which senses the actual position of the load. A synchronizing circuit is associated with the phase jogging circuit and is operable to automatically operate the phase jogging circuit to establish an in-phase relationship between one of the driven loads relative to another of the driven loads. The synchronizing circuit provides a means of aligning a moving member with another moving member while the moving members are moving.

SUMMARY OF THE PRESENT INVENTION

In accordance with the present invention, a control for a drive or a plurality of drives is provided for controlling a driven load to maintain the phase and velocity of the load substantially coincident to the desired phase and velocity of the load. The control includes a generating means for generating a reference pulse train wherein each incremental pulse is indicative of a desired incremental movement of the load and the frequency of the reference pulses is indicative of a desired velocity of the load. Sensing means is provided for sensing the actual incremental movement and velocity of the load and establishing a second pulse train wherein each incremental pulse is indicative of an actual incremental movement of the load and the frequency of the pulses is indicative of the actual velocity of the load. Digital summing means is provided for summing pulses of the reference pulse train and pulses of the second pulse train for generating a position error signal indicative of the position error between the actual incremental movement of the load and the desired incremental movement of the load. The positional error signal is directed to a velocity control means for varying the velocity of the load to drive the load substantially at the desired velocity by establishing a zero average velocity error. A phase jogging circuit is provided for blocking the application of pulses to the digital summing means from one of the pulse trains to thereby incrementally shift the phase of the driven load. The phase jogging circuit enables the controlled velocity drive to incrementally shift the phase of the driven load with respect to the phase of another driven load or with respect to the phase of the reference pulse train.

The present invention further provides a control for a plurality of drives each of which has a driven load associated therewith including generating means for generating a reference pulse train wherein each pulse is indicative of a desired incremental movement of the loads and the frequency of the reference pulses is indicative of a desired velocity of the loads. A plurality of sensing means are provided each of which is associated with one of the driven loads for sensing the actual incremental movement and velocity of the associated load and establishing a second pulse train wherein each incremental pulse is indicative of an actual incremental movement of the associated load and the frequency of the pulses is indicative of the actual velocity of the associated load. The reference pulse train and the second pulse train are directed to a plurality of digital summing means each of which is associated with one of the drives and its associated load for summing pulses of the second pulse train and of the reference pulse train for generating a position error signal indicative of the positional error between the actual incremental movement of the associated load and the desired incremental movement of the associated load. A plurality of velocity control means each of which is associated with one of the drives are provided which are responsive to the positional error signal for varying the velocity of the associated load to drive the associated loads substantially at the desired velocity. A plurality of second sensing means are provided each of which is associated with one of the loads for sensing an actual position of the associated load and establishing a signal indicative of the actual position of the associated load.

Synchronizing means are provided responsive to the plurality of actual position signals for determining the actual position of one of the associated loads relative to the actual position of another of the associated loads. The synchronizing means is connected to a phase jogging circuit which is operable to incrementally shift the phase of one of the associated loads relative to another of the associated loads to establish a predetermined phase relationship between the one and the other associated load. The synchronizing means operates to count the number of pulses apart that the one load is to the other load to establish a phase error signal. The synchronizing means then positions the loads relative to each other by operating the phase jogging circuit to thereby maintain synchronization between the one and the other load. The synchronizing means is an open loop system in that it is a pure digital arrangement, and therefore is not subject to the instabilities associated with a high gain close loop system. Moreover, since the accuracy in maintaining the synchronization is dependent upon the resolution of the pulse pickup associated with the second sensing means for generating the second pulse train, the accuracy can be maintained to a high degree. The present control for a drive by combining both digital and analog techniques provides a distinct advantage over the known pure analog systems and the known pure digital system in that the present drive control is stabler and easier to operate than known analog systems. Morover, due to digital techniques, the phase relationship can be read directly in terms of a number which has an accuracy equal to the accuracy of the resolution of the pickup for sensing the second pulses.

DESCRIPTION OF THE PREFERRED EMBODIMENT

Figure 1:
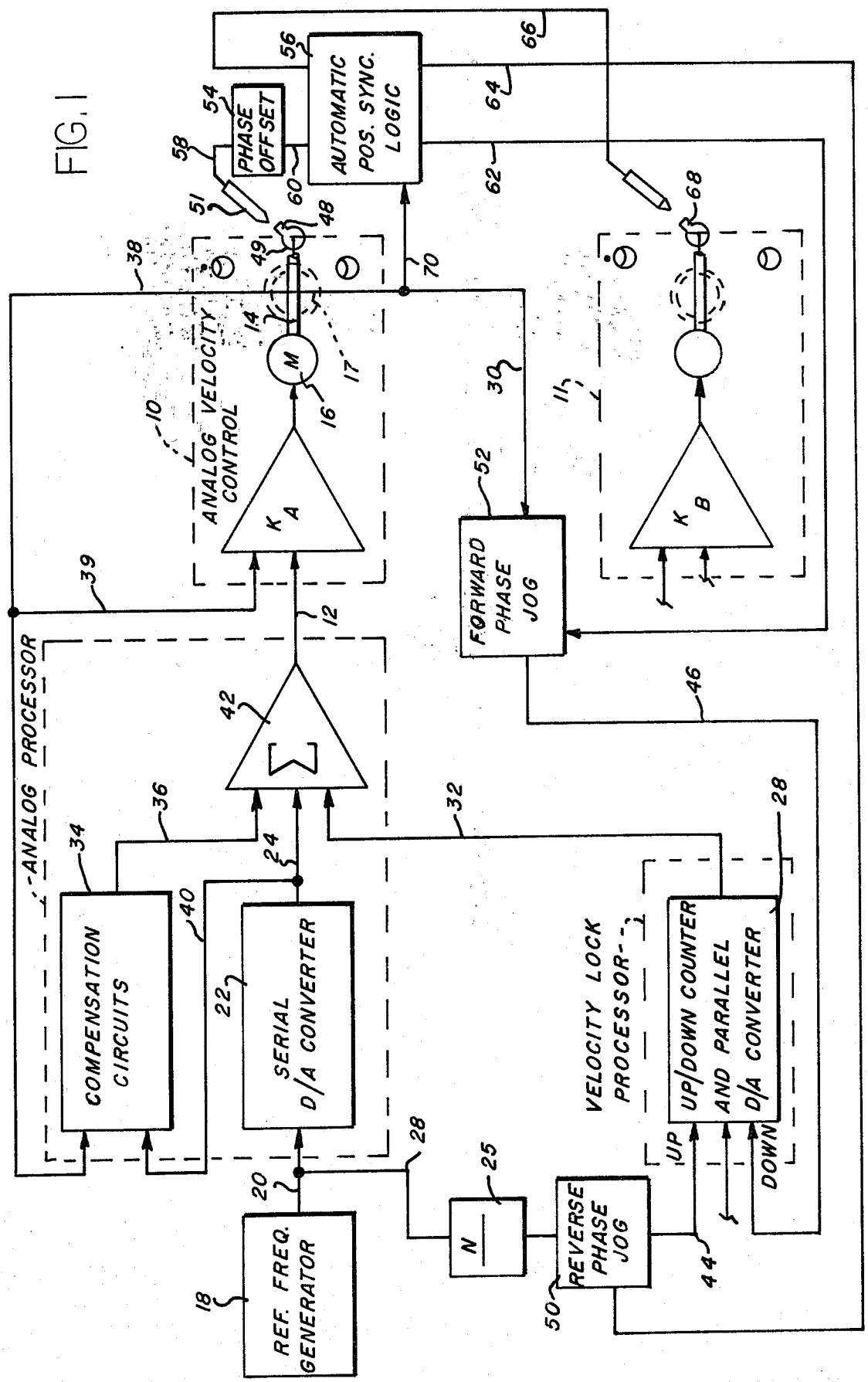
FIG. 1 is a block diagram illustrating the controlled velocity drive.

FIG. 1 schematically illustrates the control for a plurality of drives each of which include an analog velocity control 10, 11 which may be similar to the analog velocity control disclosed in the O'Callaghan U.S. Pat. No. 3,629,633. The analog velocity control 10 is controlled by an input signal on the line 12 which sets the desired speed of a load 14, which is schematically illustrated as the output shaft of a motor 16. While the control for the controlled velocity drive 10 will be described in detail the control, not illustrated, for the controlled velocity drive 11 will be similar to that described in conjunction with the controlled velocity drive 10 and hence will not be described in detail.

A reference frequency generator 18 is provided for generating a reference pulse train on its output line 20. The reference pulse train is scaled by a divider circuit 25 before it is directed to each of the controlled velocity drives. While the reference pulse train is illustrated as being directed only to the control for the analog velocity control 10, it should be apparent that the reference pulse train will also be directed to the control associated with the analog velocity control 11. A divider circuit is provided for scaling the referenced pulse train each time it is directed to a control so as to provide a reference signal for each control to maintain all of the driven loads operating at the same velocity. The divider circuit scales the reference pulse train to compensate for differences in the drives so that all the drives are operated at the same velocity. The reference pulse train, after it is scaled, has a frequency which is indicative of the desired velocity of the load associated with the controlled velocity drive to which the reference frequency is directed and each pulse is indicative of a desired incremental movement of the load associated with the controlled velocity drive. In the present instance the reference pulse train has a frequency which is indicative of the desired velocity of the load 14 and each pulse is indicative of a desired incremental movement of the load 14. The reference pulse train is directed along line 20 to a serial digital to analog (D/A) converter 22 which converts the reference pulse train to an analog base velocity signal which is indicative of the desired velocity of the load 14. The analog base velocity signal is directed on line 24 to an operational amplifier 42.

An encoder, schematically illustrated as a pulse generator 17, is connected to the load 14 and establishes a second pulse train on line 30 wherein each pulse is indicative of an actual incremental movement of the load and the frequency of the pulses is indicative of the actual velocity of the load. The pulse generator 17 may take the form of a tooth wheel rotatable with the load 14 and a pulse pickup associated with the wheel. The pickup will be operable to generate a single pulse each time a tooth passes the pickup. Thus, the encoder will generate a specific number of pulses per revolution, which number of pulses is determined by the number of teeth on the toothed wheel. The frequency of the pulses will be dependent upon the velocity of the load.

The reference pulse train is directed along line 26 through the scaler 25 to a phase jog circuit 50 which will hereinafter be described in further detail. The reference pulse train is then directed from the phase jog circuit 50 along line 44 to an up-down counter and parallel digital to analog converter 28. The pulses on line 30 of the second pulse train are directed through a second phase jog circuit 52 to line 46 which then directs the pulses to the other terminal of the up-down counter and parallel D/A converter 28. The pulses of the reference pulse train on line 44 and the pulses of the second pulse train on line 46 are directed to the up-down counter and parallel D/A converter 28 which acts as a digital summer to sum the pulses of the reference pulse train and the second pulse train to produce an analog position error signal. The digital summer operates as an integrator in that it sums the incremental position pulses and generates a position error signal. Since the frequency of the pulses is indicative of velocity, the summer acts to integrate the velocity to derive the position error signal.

It should be appreciated that the frequency of the pulses of the reference pulse train and the second pulse train are scaled such that there will be a correspondence between the pulses of the two pulse trains when the actual velocity of the load corresponds to the desired velocity of the load. This correspondence can generally be in a one to one correspondence such that if the load is running at the desired velocity than the frequency of pulses of the second pulse train will be equal to the frequency of the pulses of the reference pulse train. If the frequency of pulses is different, this will be sensed by the up-down counter and parallel D/A converter 28 and an error signal will be established on line 32 which is indicative of the position error. The position error is the difference between the desired incremental movement of the load which is indicated by the reference pulse train and the actual incremental movement of the load which is indicated by the second pulse train. It should be appreciated that while we speak of position error, the position error is a relative position error in that each pulse on the second pulse train is indicative of an incremental movement of the load 14 and is not indicative of an actual position of the load. Rather, it is indicative of a position of the load relative to the desired position of the load as established by the reference pulse train.

A compensation circuit 34 is provided for generating a compensation signal on line 36 which is utilized to stabilize the control system. To this end, a tachometer generator, not illustrated, is connected with the load 14 and produces an analog voltage on line 38 which is indicative of the actual velocity of the load 14. This actual velocity signal is directed along line 38 to the compensation circuit 34. The output of the serial D/A converter 22 which is an analog voltage which is indicative of the desired velocity of the load is directed along line 40 to the input of the compensation circuit 34. The compensation circuit will then combine the signals indicative of the actual velocity of the load and the desired velocity of the load and generate an analog compensation signal on line 36. The compensation signal on line 36 will be an acceleration error signal since the compensation circuit 34 will function to differentiate the difference between the actual velocity as sensed on line 38 and the desired velocity as sensed on line 40.

The reference velocity signal on line 24, the analog position error signal on line 32 and the compensation signal on line 36 will be combined by an operational amplifier 42 which will then generate on line 12 an analog control signal which is directed to the analog velocity control 10, along with a feedback signal on line 39 which is indicative of the actual velocity of the load, for controlling the velocity of the load 14. The control signal directed along the line 12 will be such to control the velocity of the load so that a zero average error in velocity results over a predetermined period of time. While a reference frequency generator 18 has been illustrated in the figures it should be appreciated that a suitable velocity control could be utilized to control the speed of another drive, not illustrated, and a pulse pick up could be utilized to generate a feedback pulse train indicative of the movement and velocity of the other drive which would function as the reference pulse train for the drive 10. In this manner, the reference frequency generator 18 could be eliminated and the drives 10 and 11 would be slaved to the pulse train established by the pulse pick up associated with the other drive.

The actual position of the load 14 is sensed by a pulse generator 48 which includes a single tooth gear 49 and a pulse pickup 51. The single tooth gear 49 is connected to the load 14 so that the gear rotates once for each revolution of the load 14. The pulse pickup 51 senses the passage of the single tooth on the gear 49 and generates a single pulse everytime the tooth passes the pulse pickup 51. This establishes a pulse train on line 58 which sets the zero reference point for the drive. The zero reference point is defined as the point in time when the single tooth passes the pulse pickup 51. Thus, the pulse generator 48 is operable to sense the actual position of the load 14 in contrast to the pulse train established on line 30 which is indicative of the actual incremental movement of the load 14 irrespective of the actual position of the load 14. However, as stated hereinabove, the pulse train established on line 30 cannot sense the actual position of the load 14 due to the fact that the pulse train 30 has no zero reference point.

The pulse train established on line 58 is directed through a phase offset circuit 54, whose operation will be more fully defined hereinafter, along line 60 to an input of the automatic position synchronization logic 56. The automatic position synchronization logic also receives a pulse train on line 66 which is established by single tooth pulse generator 68 associated with the controlled velocity drive 11. Thus, a signal is directed to the automatic synchronization logic on line 60 which is indicative of the zero position of the load associated with the controlled velocity drive 10 and on line 66 which is indicative of the zero position of the load associated with the controlled velocity drive 11. The automatic position synchronization logic 56 also receives an input on line 70 which is the second pulse train indicative of the incremental movement of the load 14 of the controlled velocity drive 10. The automatic position synchronization logic 56 is operable to sense the relative and actual positions of the loads of the controlled velocity drives 10 and 11. The automatic position synchronization logic 56 senses the zero pulse from the drive 10 on line 60 and the zero pulse from drive 11 on line 66 and then counts the number of pulses on line 70 between the sensing of the zero pulse from drive 10 and the zero pulse from drive 11. The number of pulses that are directed to the automatic position synchronization logic 56 on line 70 between the sensing of the two zero points is indicative of the phase off-set between the loads on the drives 10 and 11. The automatic position synchronization logic 56 is then operable to actuate one of the phase jog circuits 50, 52 to either speed up or slow down the load 14 of the controlled velocity drive 10 to thereby bring the load of drive 10 into phase with the load of drive 11. While the automatic position synchronization logic 56 has been illustrated as counting the number of pulses on line 70, it should be apparent that the automatic position synchronization logic could also count the number of pulses on line 44 from the reference frequency generator 18 between the sensing of zero pulses on lines 60 and 66.

The automatic position synchronization logic 56 brings the loads from drives 10 and 11 into phase by actuating one of the phase log circuits 50 and 52 which operate to block pulses to either the up or down count terminals of the binary counter 28. The blocking of pulses applied on line 46 to the down count terminal will cause a positive count build up in the counter 26 which will be directed to the controlled velocity drive 10 to speed up the drive 10 to thereby bring the load 14 of drive 10 into phase with the load on drive 11 in a manner more fully described hereinbelow. The blocking of pulses applied on line 44 to the up count terminal of the counter will cause a negative count build up in the counter 26 which will be directed to the controlled velocity drive 10 to cause the drive 10 to slow down to bring the loads of drives 10 and 11 into phase.

The control for the controlled velocity drive 10 also includes a phase offset circuit 54 which is operable to provide a phase offset between the loads on the plurality of controlled velocity drives. The phase offset circuit 54 operates to delay the passage of the zero pulse from the pulse generator 48 to the automatic position synchronization logic 56. The delay of the zero pulse to the automatic synchronization logic 56 establishes a zero pulse which has been delayed a predetermined amount on line 60. The delaying of the zero pulse and the subsequent synchronization of the delayed zero pulse from drive 10 with the undelayed zero pulse from drive 11 causes a predetermined phase offset to be established between the loads of the drives 10 and 11 which is equal to the number of pulses sensed on line 70 during the time period that the zero pulse is delayed, as will be more fully described hereinbelow.

Figure 2:
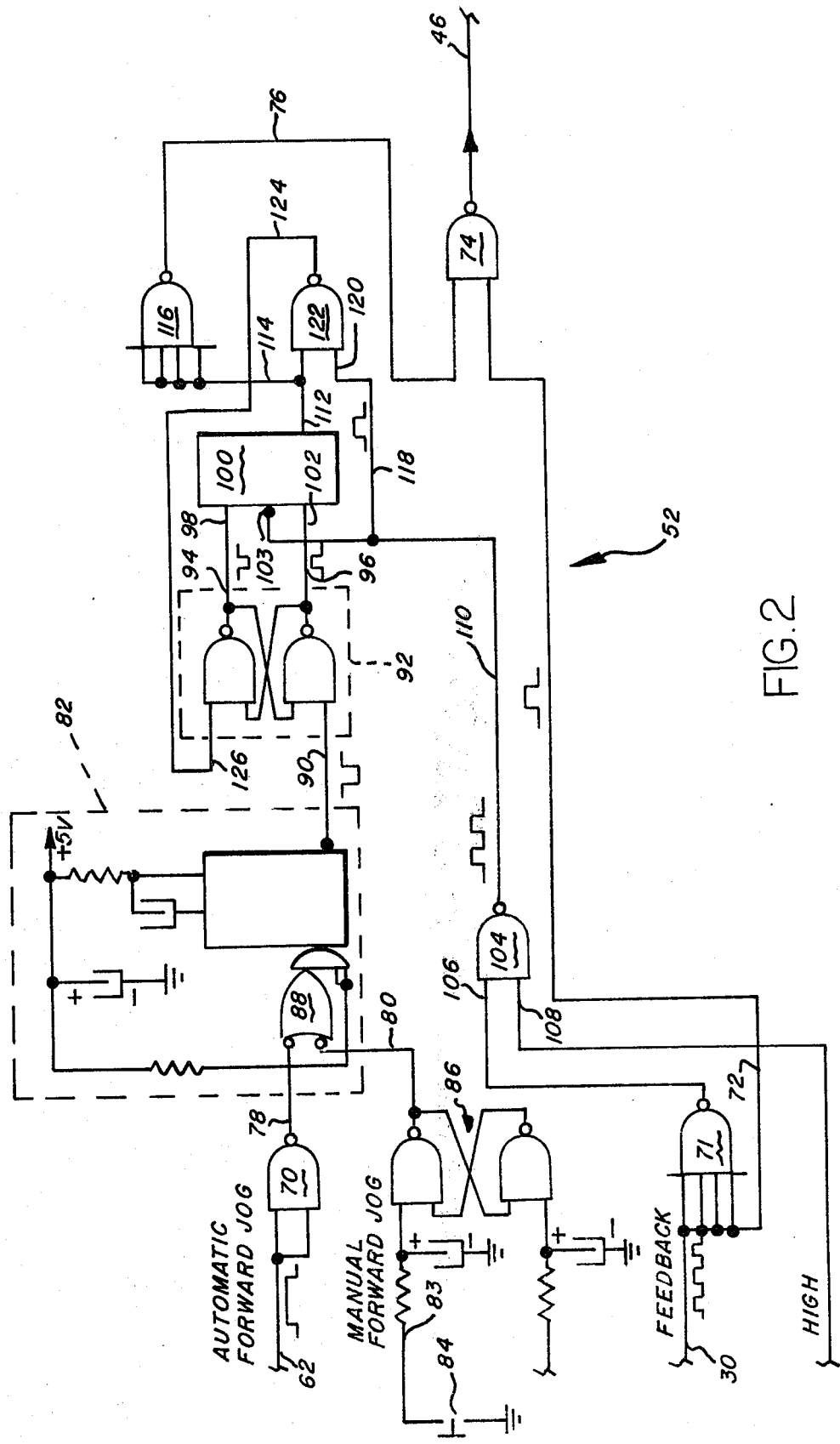
FIG. 2 is a schematic block diagram illustrating the forward jog circuit.

Referring to FIG. 2, the operation of the phase jog circuits 50 and 52 will be more fully discussed. The phase jog circuit 52 can be considered the forward phase jog circuit in that the phase jog circuit 52 will operate to block pulses directed to the down count terminal of the up-down counter and parallel D/A converter 28. Elimination of a pulse on the down count terminal will cause the counter to build up a high count therein which will effect an increase in the velocity of the load associated with the controlled velocity drive 10 thereby moving the load associated with the controlled velocity drive 10 forward in relationship to the load connected to the controlled velocity drive 11. The phase jog circuit 50 is the reverse phase jog circuit and operates to block pulses to the up count terminal of the counter 28. The blocking of pulses to the up count terminal of the counter 28 causes the count in the counter 28 to decrease thereby causing the load associated with the controlled velocity drive 10 to slow down relative to the load associated with the controlled velocity drive 11. Since the operation of the forward phase jog circuit 52 is identical to that of the reverse phase jog circuit 50, only the operation of the forward phase jog circuit 52 will be described in detail.

The feedback pulses indicative of incremental movements of the load 14 are directed along line 30 to the inputs of a NAND gate 71 and to line 72. The line 72 directs the feedback pulses to an input of a NAND gate 74 which has its other input terminal connected by line 76 to the output of NAND gate 116 which normally has a high output state when it is not desired to block the pulse applied to NAND gate 74. Thus, normally, when line 76 is high, the feedback pulses are directed along line 30, line 72 and through the NAND gate 74. The NAND gate 74 inverts the pulses applied thereto and applies them to line 46 which is directed to the down count terminal of the up/down counter 28. Thus, when line 76 is high the NAND gate 74 will transmit the feedback pulses on line 30 to the down count terminal of the up/down counter 28. When it is desired to jog the load 14 by eliminating pulses from the feedback pulse train the line 76 will have a low applied thereto which blocks the feedback pulses applied to NAND gate 74 and prevents the feedback pulses from being applied to the down count terminal of the up/down counter 28.

When it is desired to block feedback pulses either the manual forward jog command or the automatic forward jog command is initiated to respectively apply a low on lines 80 or 78. The automatic forward jog command is connected by lines 62 to the automatic position and synchronization logic 56 as is illustrated in FIG. 1. When it is desired to automatically activate the forward jog circuit 52 by the automatic synchronization logic 56, the automatic position synchronization logic 56 applies a high on line 62. The high on line 62 will be directed to the inputs of a NAND gate 70 which will cause a low to be applied on the output line 78 of NAND gate 70. The manual forward jog command will be activated by a pushbutton 84 which is operable when depressed to ground line 83 and causes the flip flop 86 to establish a low on the output line 80 thereof.

Lines 78 and 80 from the automatic and manual jog commands, respectively, are connected to the inputs of an OR gate 88 disposed in a single shot 82. A low pulse on either input line 78 or 80 causes the single shot 82 to establish a low on the output line 90 thereof. The low on line 90 is directed to the set input of a flip flop 92. Setting of flip flop 92 by the low pulse on line 90 causes the output terminal 94 thereof to go low and the output terminal 96 thereof to go high. The low on line 94 is directed to an input 98 of flip flop 100 and the high on line 96 is directed to an input 102 of the flip flop 100. Flip flop 100 also includes a clock input 103 which receives pulses from the feedback pulse train on line 30 after the feedback pulses pass through a pair of buffer NAND gates 71 and 104. The feedback pulses which are directed to the clock input 103 of the flip flop 100 are inverted by the NAND gate 71 and are directed along line 106 to an input of the NAND gate 104. The NAND gate 104 also includes an input 108 which has a high normally disposed thereon. Thus, as the feedback pulses are fed through NAND gate 71 they are inverted and then inverted again by NAND gate 104 which then directs the feedback pulse train along line 110 to the clock input 103 of the flip flop 100. The feedback pulses on line 110 will also be directed along line 118 to the input of NAND gate 122. However, since line 112 normally has a low thereon NAND gate 122 will not pass the feedback pulses as it is blocked by the low on line 112. Flip flop 100 is an edge-triggered flip flop and upon the next one to zero transition of the feedback pulses on line 110, the flip flop 100 transfers the high applied at the input 102 thereof to its output terminal 112. The high on line 112 causes a high to be directed along line 114 to the inputs of the NAND gate 116. When the inputs of the NAND gate 116 go high a low will be applied at the output thereof to the line 76. The low applied on the line 76 will be directed to the NAND gate 74 and prevent pulses on line 72 from being directed through the NAND gate 74 to the up-down counter 26. Thus, when a low output is established on line 76, feedback pulses on line 30 are effectively blocked from the up-down counter 28.

The next sequential feedback pulse directed along line 110 to the clock input 103 of flip flop 100 will also be applied along line 118 to the input 120 of NAND gate 122. The NAND gate 122 also has an input connected to the output of flip flop 100 via line 112. Since the output of flip flop 100 on line 112 is now high, the pulse applied along line 118 to the input of 120 of NAND gate 122 will be inverted and a low will be established on the output line 124 of the NAND gate 122. The line 124 directs the low to the reset terminal 126 of flip flop 92 thereby resetting flip flop 92 and effecting a high on line 94 and a low on line 96. Since terminal 98 of flip flop 100 now has a high applied thereto and terminal 102 now has a low applied thereto, the trailing edge of the pulse applied on line 110 to the clock input of flip flop 100, will reset flip flop 100 and a low will be established on the output line 112 thereof. The low on output line 112 will be applied to the NAND gate 122 to thereby block NAND gate 122 and along line 114 to the input of the NAND gate 116 to thereby cause a high to be established on line 76. The high on line 76 conditions the NAND gate 74 to allow feedback pulses on line 72 to again be applied through the NAND gate 74 along line 46 to the up/down counter 28.

It should be apparent that for every forward jog command signal applied by either the manual forward jog command on line 80 or the automatic forward jog command on line 78 one and only one pulse will be eliminated from the feedback pulse train on line 30 by blocking the NAND gate 74 to prevent the application of the feedback pulse to the input of the up/down counter 28. The forward jog command signal causes the setting of the flip flops 92 and 100. When the flip flop 100 is set the first feedback pulse applied to the terminal 103 will cause the output 112 of flip flop 100 to go high thereby causing the output of NAND gate 116 to go low to block next feedback pulses applied to the NAND gate 74. The next sequential or second feedback pulse that is applied along the feedback line 30 will be blocked by the NAND gate 74 and will be directed to the input of the NAND gate 122 which has been conditioned by the output of flip flop 10 to enable the pulse to reset flip flop 92 to allow flip flop 100 to be reset upon the one to zero transition portion or trailing edge of the second feedback pulse applied to the terminal 103. Resetting of the flip flop 100 will cause the feedback line 76 to go high and enable the next sequential feedback pulse or third pulse applied along line 72 to be directed to the up/down counter 28 by the NAND gate 74. Thus, it should be apparent that the phase jog circuit 52 operates to block the application of one pulse to the up-down counter 28 and then automatically resets itself to pass the next pulse to the up/down counter 28.

The phase jogging circuit provides a means of incrementally shifting the phase of one of the output shafts of the controlled velocity drives 10 or 11 relative to the other shaft. The shift can be bi-directional, depending on whether the phase jog circuit 50 or 52 is actuated. The minimum shift increment will be set by the resolution of the feedback transducer. In a preferred embodiment the feedback transducer is a 60-tooth gear which generates 60 pulses per revolution or one pulse every 6°. The phase jog circuit thus acts to change the relative phase angles of the loads of the controlled velocity drives 10 and 11 from an initial phase angle by eliminating a measured amount of reference, or feedback pulses. Since the control system keeps track of load position by counting reference and feedback pulses, the elimination of one pulse from the reference pulse train causes the rotating load to move behind one pulse to keep balance in the up/down counter 28. The elimination of one feedback pulse causes the rotating load to move ahead one pulse to keep the up/down counter at balance in a similar manner.

The frequency of energization of the automatic jog command sets the jog rate and may be controlled by circuitry in the automatic position synchronization logic 56 since the logic 56 controls the energization of both the forward and reverse automatic jog commands. In a preferred embodiment of the invention, the jog frequency should be limited to 10 percent of the feedback frequency to minimize loop disturbances. This will be described more fully hereinbelow in conjunction with the description of the automatic position synchronization logic 56.

Figure 3:
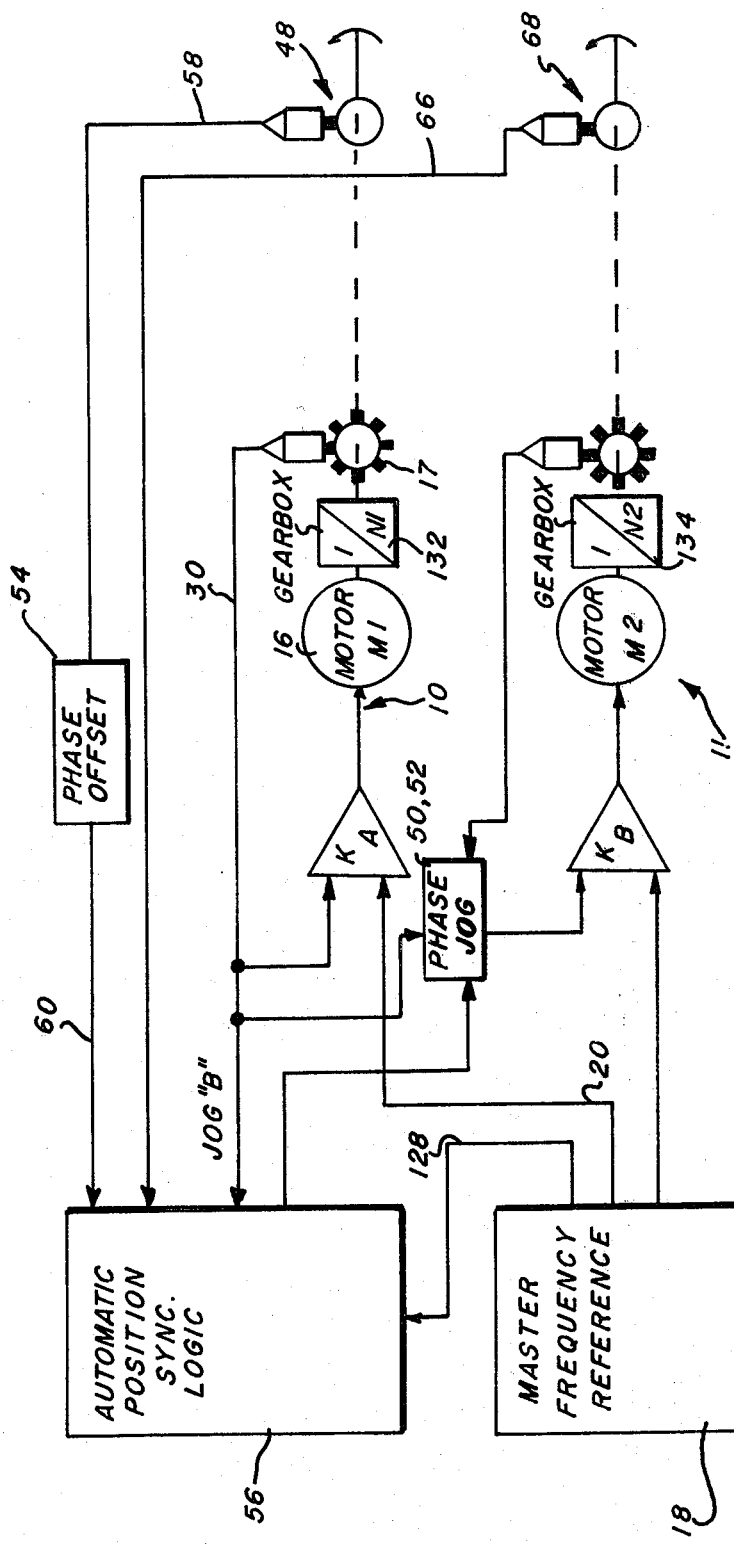
FIG. 3 is a schematic diagram of the automatic position synchronization logic.
Figure 4:
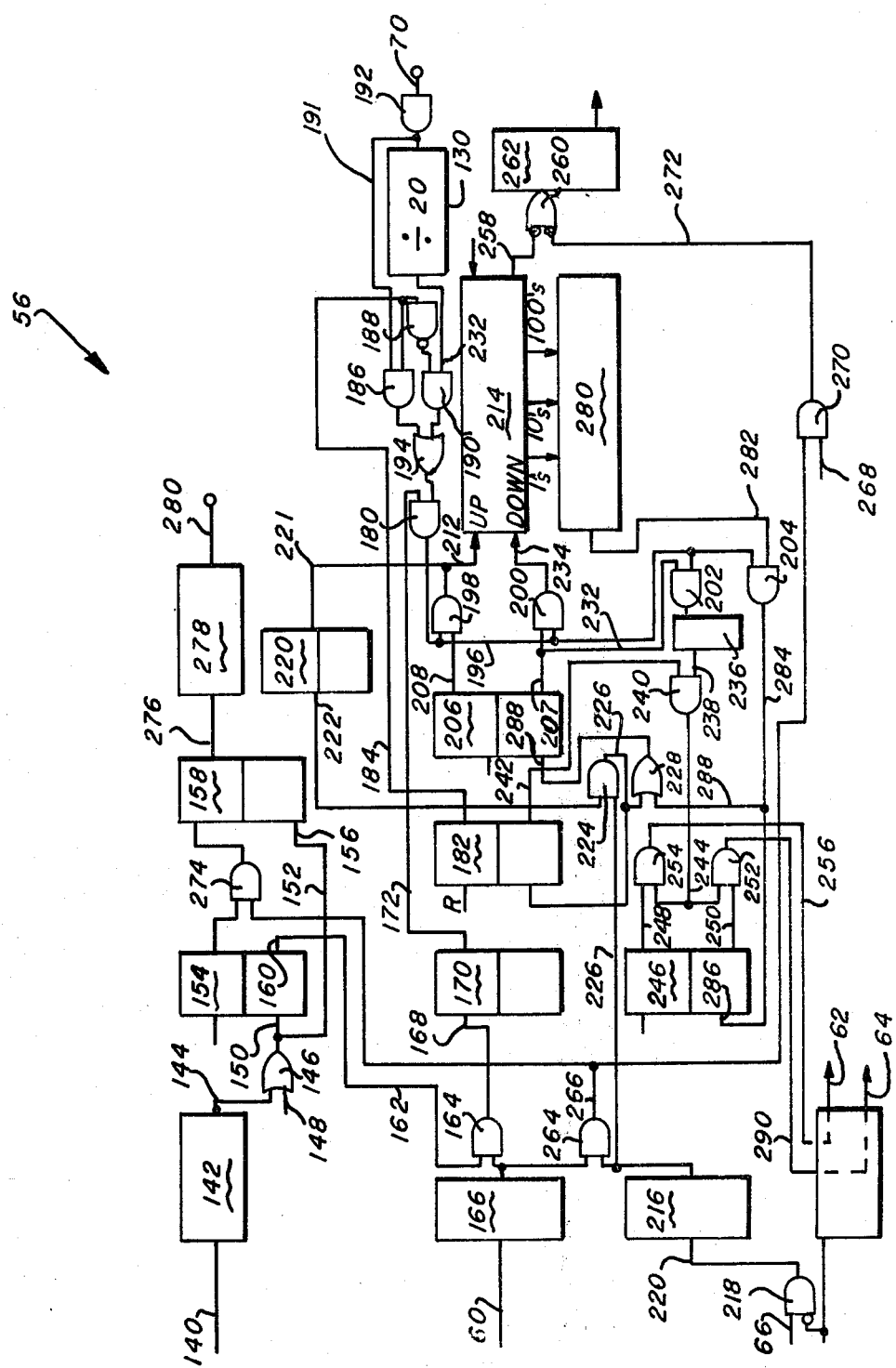
FIG. 4 is a logic diagram more fully illustrating the automatic position synchronization logic.

The operation of the automatic synchronization logic 56 will be more fully understood with reference to FIGS. 3 and 4. As is illustrated in FIG. 3, the automatic position synchronization logic 56 receives a pair of inputs on lines 60 and 66 from the single pulse generators 48 and 68 respectively. The inputs from the single pulse generators 48 and 68 are indicative of the zero positions of the loads of the controlled velocity drives 10 and 11. The automatic position synchronization logic also receives an input on line 30 from the pulse generator 17 which establishes a feedback pulse train wherein each incremental pulse is indicative of a predetermined incremental movement of the load 14 of the drive 10 and the frequency of the pulses is indicative of the velocity of the load 14. The automatic position synchronization logic 56 also receives an input on line 128 from the master frequency reference generator 18.

The master frequency reference generator 18 establishes a reference signal which is directed to the automatic position synchronization logic 56, the controlled velocity drive 10, and the controlled velocity drive 11 to synchronize the speeds of the output shafts. The master frequency reference can be scaled as it is directed to the different drives so that if any difference exists in the drives, such as in the gear reducers 132 and 134 associated with the drives 10 and 11 respectively, the difference can be made up by adjusting the frequency fed to each drive such that the output velocities of all of the drives are equal.

The automatic synchronization logic operates to establish the proper phase relationship between shafts. This is done by monitoring a zero, or marker pulse, on each shaft as sensed by the pulse generators 48 and 68. It should be appreciated that the present system could be used with other than a rotating shaft. For example, in a conveyor system, the zero or marker pulse may be any repeating position function. The automatic position synchronization logic 56 monitors the zero pulses on the two different shafts and measures the number of feedback pulses on line 30 that occur between the sensing of the zero pulses from both generators 48 and 68. If the drives are phase locked to a zero phase difference the pulse on lines 60 and 66 will be coincidence. However, if there is a phase difference the pulses on line 60 and 66 will not be coincident and the number of pulses on line 30 will be counted between sensing the zero pulse on line 60 and the zero pulse on line 66. The automatic position synchronization logic 56 then computes the phase difference between the two shifts by sensing the pulses counted on line 30. Assuming a 60 tooth gear 17 is utilized, each pulse counted on line 30 between the sensing of the two zero pules on lines 60 and 66 will be indicative of a 6 degree phase offset. The automatic position synchronization logic, once it determines the phase error between the two shafts, will activate one of the phase jog circuits 50, 52 depending on the magnitude and sign of the phase error to jog one of the drives to obtain a zero phase angle between the two output shafts.

The automatic position synchronization logic 56 will operate in one of two modes of operation. These two modes will be defined as cases where the phase displacement between the two loads is less than 180° and the case where the phase displacement is greater than 180°. When the phase displacement is less than 180° the automatic position synchronization logic 56 measures the number of feedback pulses that occur between the zero point on drive 10 and the zero point on drive 11 by counting the feedback pulses in a counter. The position synchronization logic 56 then jogs the lagging drive ahead the number of pulses that it lagged behind the other drive, which is equal to the number of pulses in the counter. In the case of phase displacements greater than 180°, the automatic position synchronization logic 56 counts the number of pulses that the one drive leads the other drive by starting the counter at the leading drive zero point and counting up the number of feedback pulses that occur up to 180°. Then the counter counts down the number of feedback pulses sensed after 180° until the lagging drive zero is sensed. The automatic position synchronization logic 56 then jogs the lagging motor back the number of pulses that remain in the counter to thereby synchronize the drives. In other words, the automatic position synchronization logic 56 does not jog the lagging drive ahead but rather jogs the lagging drive back so that in essence it is 360° out of phase which is the same as being in phase.

The operation of the automatic synchronization logic will be more fully described with reference to FIG. 4. In discussing FIG. 4 the operation of the automatic synchronization logic 56 will be described with reference to the two cases where the phase displacement between the drives is less than 180°, case 1, and the phase displacement is greater than 180°, case 2. Assuming the phase displacement is less than 180° the logic circuitry of FIG. 4 will operate as follows. When it is desired to initiate the automatic position synchronization logic 56, the logic circuitry is initialized. Initialization of the automatic position synchronization logic 56 is accomplished by putting a high signal on line 140 to actuate a single shot 142. Actuation of single shot 142 applies a high signal on line 144 through the OR gate 146 to the set input 150 of the flip flop 154 thereby setting flip flop 154. The high from the OR gate 146 is also directed along line 152 to the set input 156 of flip flop 158 thereby setting flip flop 158. OR gate 146 is provided with another input 148 which may be connected to another drive to be synchronized, not illustrated.

Setting of flip flop 154 causes a high signal to be applied on the output 160 along line 162 to prime AND gate 164. Priming of the AND gate 164 by flip flop 154 enables the AND gate 164 to pass the next zero pulse from the controlled velocity drive 10 which is applied thereto on line 60 through a single shot 166. The zero pulse that is applied on line 60 will actuate the single shot 166 and be directed through the AND gate 164 to the set terminal 168 of a flip flop 170 thereby setting flip flop 170. Setting of flip flop 170 will cause a high to be applied on line 172 to prime and AND gate 180.

A flip flop 182 is provided to prime AND gate 186. The flip flop 182 has either a set or reset condition depending on whether the automatic synchronization logic is in the jog mode or the not jog mode. When the present circuit is initilized flip flop 182 is in the not job mode and is in its reset condition. When flip flop 182 is set line 184 connected to the output thereof is high. The high on line 184 primes AND gate 186 and blocks AND gate 190 through an inverter gate 188. When AND gate 186 is primed feedback pulses applied thereto from line 70 will be passed therethrough. Line 70 directs the feedback pulses from the positional encoder 17, through buffer gate 192, along line 191, to an input of AND gate 186 which has been primed by flip flop 182. The feedback pulses indicative of increment movements of the load 14 are directed from the AND gate 186, through OR gate 194 to the input of the AND gate 180. Since the AND gate 180 has been primed by the setting of flip flop 170 the pulses are directed through the AND gate 180 to line 196 where the pulses are directed to the imputs of AND gates 198, 200, 202, and 204.

Upon initialization of the automatic position synchronization circuit 56 flip flop 206 will be in its reset condition and will apply a high to the input terminal 208 of AND gate 198 to thereby prime AND gate 198. Flipflop 206 when in its reset condition will also apply a low from its output terminal 207 to the input terminal 210 of AND gate 200 thereby blocking AND gate 200. Thus, pulses applied on line 70 will be directed through the buffer gates 192, through the primed gate 186, through OR gate 194, and through the primed gates 180 and 198 to the up-count terminal 212 of the up/down counter 214. The counter 214 then begins counting the number of feedback pulses indicative of incremental movements of the load 14 on line 70 starting when the zero pulse from the controlled velocity drive 10 is sensed on line 60. It should be appreciated that the zero pulse from the single tooth encoder 48 associated with drive 10 will be applied on line 60 to effect priming of the AND gate 180 thereby allowing the pulses to be applied to the counter 214. Prior to the zero pulse being sensed on line 60 the AND gate 180 will be blocked and the counter 214 will be prevented from counting. When the zero pulse from drive 11 is sensed on line 66, a single shot 216 will be actuated. The zero pulse is applied on line 66 through the gate 218 along line 220 to the input of the single shot 216.

The first feedback pulse that is applied to the up-count terminal 212 of counter 214 from the AND gate 198 will also be directed along line 221 to flip flop 220 to set flip flop 220. The setting of lip flop 220 applies a high on line 222 to thereby prime AND gate 224. The counter 214 will continue to count feedback pulses applied to the up-count terminal 212 thereof until the zero pulse from drive 11 is sensed on line 66. It should be apparent that the counter 214 will count at least one pulse between the sensing of the zero pulse for the drive 10 and the sensing of the zero pulses for the drive 11 if the drives are not in phase. When the zero pulse from the drive 11 is applied on line 66 the single shot 216 will be actuated to apply a high on line 226 to the input of the AND gate 224 which has been primed by the flip flop 220. The zero pulse is then applied through the AND gate 224 to line 226 to set flip flop 182 and through OR gate 228 to the set input 288 of flip flop 206 to thereby set flip flop 206. The setting of flip flop 182 causes a low to be applied on line 184 to gate 188 and applies a low to AND gate 186 thereby blocking AND gate 186. Blocking of AND gate 186 prevents the application of the feedback pulses to the counter 214. Since gate 188 is an inverting gate the AND gate 188 applies a high to AND gate 190 thereby priming AND gate 190. The priming of AND gate 190 enables the feedback pulses on line 70 from the positional encoder 17 to be applied therethrough after the feedback pulses have passed through a divide by twenty circuit 130 which directs the pulses to the input 232 of the AND gate 190. Pulses applied to the now primed AND gate 190 are directed through OR gate 194 and through the AND gate 180 to line 196.

Setting of flip flop 206 causes a low to be applied along line 208 to block the AND gate 198 and a high to be applied on the output 207 thereof. The high applied at the output terminal 207 applies a high to the input 210 of the AND gate 200 to prime AND gate 200 and also applies a high along the line 232 to an input of the AND gate 202 to thereby prime AND gate 202. The feedback pulses after being passed through the divide by twenty circuit 130 will be directed along line 196 through the now primed AND gate 200 to the down-count terminal 234 of the up/down counter 214.

The pulses will also be applied along line 196 through the now primed AND gate 202 to actuate a single shot 236. Activation of the single shot 236 will effect a high output pulse on the line 238 which will be directed to the input of the AND gate 240. Since flip flop 182 is in its set condition a high will be applied along line 242 to prime the AND gate 240. Thus, activation of the single shot 236 will cause a pulse to be applied through the AND gate 240 to line 244.

Since we are dealing with case 1 wherein the drives are less than 180° out of phase, the counter 214 has not sensed the 180° out of phase point, which would be 30 counts in the counter 214 since a 60 tooth gear is utilized and 30 counts at 6° each would be equal to 180°. When the counter 214 reaches the 180° point the flip flop 246 is set as will be described more fully herein below. Thus, in case 1 the flip flop 246 is in its reset state since the 180° point between the two zero references from drives 10 and 11 has not been reached. Since flip flop 246 is in its reset condition a high will be applied on its output 248 thereof and a low will be applied on its output 250 thereof. Thus, AND gate 252 will be blocked and AND gate 254 will be primed to receive the output pulse from the AND gate 240 on line 244. The output pulse on line 244 will be directed through the AND gate 254, along line 256 to the line 62 as a forward jog pulse. As discussed hereinabove, line 62 is connected to the automatic forward jog logic 52 and will effect the elimination of a feedback pulse applied to the down-count terminal of the up/down counter 28 to thereby jog the drive 11 forward relative to drive 10.

Pulses applied on line 70 through the divide by twenty counter 130 will continue to be applied to the down-count terminal 234 of the up/down counter 214 and to the forward job circuit via the line 62 until the counter 214 counts down to zero. The pulses applied to the forward job circuit 52 will be at a lower frequency than the feedback pulses on line 70 due to the fact that the pulses are applied through the divide by twenty circuit 130. This will control the speed at which the drive is jogged forward and will prevent the drive from being jogged forward too fast. If the drive is jogged forward at too great of rate, instabilities can occur in the drive and the control. Thus, for each 20 feedback pulses applied to the divide by twenty circuit 130 one output pulse will be produced and one foward jog pulse will be issued on line 62. The lower pulse rate is to ensure that the drive can follow the jog rate.

When the counter 214 reaches zero the jogged drive will have been jogged ahead the number of pulses it was measured to be behind in the counter 214. When the counter 214 reaches zero the next pulse applied thereto will generate a borrow-out on the output terminal 258 thereof. The borrow-out pulse will be applied to the input of an OR gate 260 which directs the pulse to the input of a reset single shot 262. Activation of the reset single shot 262 will reset all of the logic to block AND gates 190 and 186 to prevent the further jogging of the drives. An AND gate 264, having its inputs connected to the single shots 166 and 216, is provided to detect coincident zero pulses on lines 60 and 66 from the drives 10 and 11. In the event the zero pulses are coincident, i.e., indicating synchronization of the drives, AND gate 264 will abort any synchronization cycle that has been initiated by the application of a high on line 140, the initialization circuit. The AND gate 264, upon sensing coincidence, will apply a high on line 266 to effect resetting of the logic if the system is not in the jog mode. If the system is not in the jog mode a high will be applied to the input 268 of the AND gate 270 to prime AND gate 270. Thus, the output pulse applied from the AND gate 264 will be directed along line 266 to the other input of the AND gate 270, since AND gate 270 has been primed the pulse on line 266 will be directed through AND gate 270 and along line 272 and through OR gate 260 to actuate the resetting single shot 262.

The activation of the resetting single shot 262 causes flip flop 154 to be reset to prime AND gate 274. Upon the next revolution of the input shafts of drives 10 and 11, the zero pulses should be synchronized and coincident as applied to line 60 and 66. AND gate 264 monitors the coincidence of the pulses and applies a reset signal upon sensing concidence to flip flop 158 through the AND gate 274 which has been primed by the resetting of flip flop 154. Resetting flip flop 158 causes an output pulse to be applied along line 276 to the single shot 278. Activation of the single shot 278 extablishes a synchronizing complete signal on the output 280 thereof.

In case two, where drive 10 leads drive 11 by greater than 180°, the same initial conditions will be applied as in case one. The phase-locking sequence will start by an initialization signal applied on line 140 to activate single shot 142. Activation of the single shot 142 sets flip flops 154 and 158. The setting of flip flop 154 primes AND gate 164 so that the next zero pulse applied on line 60 from the drive 10 sets flip flop 170. Setting of flip flop 170 primes the AND gate 180. Since we are not in the jog mode, the output on line 184 of lip flop 182 is high thereby effecting the priming of AND gate 186 and the blocking of AND gate 190. Thus, the incremental position pulses applied on line 70 are directed through the gates 186, 194 and 180 to line 196. Since flip flop 206 is still in its reset mode with the output terminal 208 thereof being high the incremental pulses applied on line 196 are applied through the AND gate 198 to the up-count terminal 212 of the up-/down counter 214.

The counter 214 counts the feedback pulses on line 70 until the counter 214 reaches a count which is equal to 180° difference between drives 10 and 11, as determined by the programming of a 180° diode matrix 280. In the preferred embodiment of the invention, as discussed hereinabove, a 60-tooth encoder is utilized to establish the feedback pulse train on line 70. If the drives are more than 180° apart the up down counter 214 will count greater than 30 pulses, i.e., 6° per pulse times 30 equals 180°. The thirty-first pulse that the counter counts will effect an output of the diode matrix 280 on line 282. Activation of the diode matrix 280 establishes a high on line 282 which primes the AND gate 204. The next feedback pulse which is applied on line 70 through the gates 186, 194 and 180 to line 196 will be passed through AND gate 204 to line 284. The pulse applied on line 284 is directed to the set input 286 of the flip flop 246 to thereby set flip flop 246. The high pulse on line 284 is also applied along line 288, through OR gate 228 to the set input 288 of flip flop 206 to set flip flop 206. The setting of flip flop 246 establishes a low on output terminal 248 to thereby block AND gate 254 and placed the logic in the reverse jog mode by causing the output terminal 250 thereof to go high to prime AND gate 252. Priming of AND gate 252 enables the AND gate 252 to pass pulses applied thereto on line 244 to line 290. Line 290 is connected to line 64 which is connected to the reverse phase job circuit 50. The setting of flip flop 206 causes a low to be applied on output terminal 208 thereof to block AND gate 198 and causes a high to be applied on the output 207 thereof to prime AND gate 200. Priming of AND gate 200 enables pulses applied on line 70 to be gated to the down-count terminal 234 of the up down counter 214. Thus, counter 214 after counting a predetermined number of feedback pulses on line 70 up to a count which is indicative of 180° phase offset between the drives now starts to count down upon the application of the next feedback pulse on line 70 to the down-count terminal 234. The counter 214 will continue to count down until the next zero pulse from the lagging drive is applied on line 66. At this point in time, when the lagging zero pulse is applied to the system, the counter 214 will have counted down to a count which is indicative of the phase offset between the drives.

When the next zero pulse arrives on line 66 from the controlled velocity drive 11 it activates the single shot 216 which applies a high pulse on line 226 to the input of the And gate 224. Since flip flop 220 has been set by the previous application of feedback pulse to the up-count terminal 212 of the counter 214, the output line 222 of the flip flop 220 is high thereby priming the AND gate 224. Thus, the output of the single shot 216 is passed through the AND gate 224 to set flip flop 182.

Setting of flip flop 182 places the logic in the job mode by establishing a low on line 184 to block AND gate 186 and prime AND gate 190. After the AND gate 190 has been primed the incremental pulses applied on line 70 will be passed through the divided by twenty circuit 140, through the gates 190, 194, and 180 to the line 196. Since the flip flop 206 has been set the pulses on line 196 will be applied through the AND gate 200 to the down-count terminal 234 of the up/down counter 214. The pulses on line 196 will also be applied through the primed AND gate 202 to actuate the single shot 236 which directs an output pulse on the ouput line 238 thereof to the AND gate 240. The AND gate 240 has been primed by the setting of the flip flop 182 and the output of the single shot 236 will be passed through the AND gate 240 to line 244. As discussed hereinabove, the pulse on line 244 will be applied through the AND gate 252 which was primed by the setting of the flip flop 246 and along line 290 to the input line 64 of the reverse phase jog circuit 50. Thus, for each pulse passed through the divide by twenty counter 130 one pulse will be directed to the reverse phase jog circuit 50. Moreover, one pulse will be applied to the reverse phase jog circuit 50 for each count stored in the counter 214 when the lagging zero pulse is applied to the automatic position synchronization logic 56.

When the counter 214 has counted down to zero, after the lagging zero pulse has been sensed, the drive 11 will have been reversed jogged to an in-phase relationship with drive 10. The next down pulse applied to the counter 214 after a zero count has been reached in the counter 214 will cause a borrow-out pulse to be issued on the ouput terminal 258 thereof. The borrow-out pulse will be applied through the OR gate 260 to the resetting single shot 262 to thereby reset the system. Resetting of the system effects resetting of flip flop 154 by the single shot 262 to prime AND gate 274 to look for coincidence of the zero pulses from the drives 10 and 11 upon the next revolution. If the drives are coincident as sensed by AND gate 264, flip flop 158 will be reset through AND gate 274. Resetting flip flop 158 actuates single shot 278 to effect a synchronization complete signal on line 280.

It should be apparent that the position synchronization logic circuit 56 senses the difference in phase between drives 10 and 11 by counting the number of incremental position pulses applied on line 70 between sensing the zero pulse from drive 10 and the zero pulse from drive 11. In the event that the phase difference between the drives are less than 180°, as sensed by the counter 214 and the 180° diode matrix 280, the counter 214 will count up the difference in phase between the two drives and will jog the lagging drive forward to make up for the lost phase difference. The jog rate will be at a controlled jog rate to prevent instabilization of the system. In the event that the drives are greater than 180° apart the system will act to jog the lagging drive backwards until the lagging drive lags 360° behind the leading drive. Since a cyclical function is being performed, when the drives are 360° offset they will also be in phase with a zero phase difference existing between the drives. To this end, the counter 214 will count up to the 180° point and issue a signal to activate the diode matrix 280. Activation of the diode matrix causes the feedback pulses applied to up-count terminal 212 of the counter 214 to now be applied to the down-count terminal 234 to enable the counter 214 to count down from the count stored therein which is equal to a 180° phase difference between the drives. The counter 214 will continue to count down until the next zero pulse arrives from the lagging drive. The count then remaining in the counter 214 will be the difference in phase between the drive as substracted from 360°. The counter 214 will then continue to count down as the drive is jogged through the reverse jog circuit until the drives are in phase. When the drives are in phase as sensed by the counter 214 counting to zero, the next revolution of the drives will be checked for coincidence of the zero pulses. If coincidence is found a synchronization complete signal will be established on line 180.

It should be apparent that the present method of jogging the drives into phase provides a distinct advantage over other automatic position synchronization logic circuitry. The automatic position synchronization logic circuitry of the present invention functions to jog the drives into phase through the shortest distance. Thus, if the drive is lagging greater than 180° the drive will not be jogged forward so that an in-phase relationship results, but will be jogged backwards until a 360° phase off-set, which is equal to a zero phase off-set results. For example, if one drive is lagging another drive by 240°, the lagging drive will be jogged backwards 120° rather than jogged forward 240°. Assuming that each feedback pulse represents 6°, if the drive is lagging 240°, the counter would count up to 40 counts. However, in the present invention the counter 214 counts up to 30 which is the 180° point and then counts backwards 10 pulses until the zero pulse from the lagging drive is sensed. At this point in time the counter will have a count of 20 stored therein. The count of 20 will be indicative of a 120° phase off-set between the present position of the drive and the position of the drive if the drive were lagging 360°. Accordingly, the lagging drive will be jogged backwards 120° until the 360° or zero phase off-seet point is reached. In this manner the lagging drive is jogged the shortest distance from its lagging position to a position in which the two drives are in phase.

Figure 5:
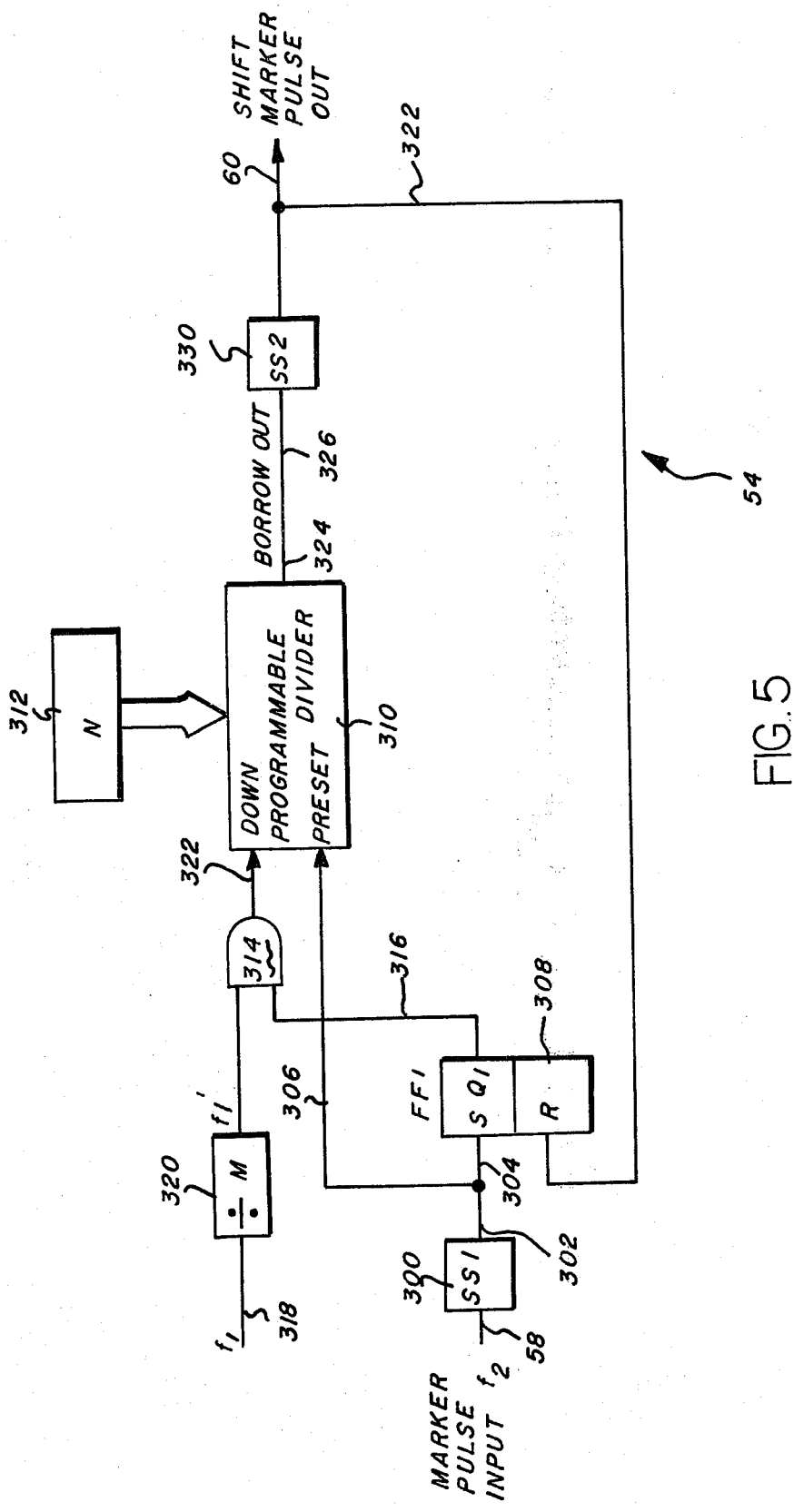
FIG. 5 is a logic diagram illustrating the phase offset circuit.

The zero pulse from drive 10 is fed to the automatic position synchronization logic 56 through the phase off-set circuit 54. The function of the phase off-set circuit 54, which may be more fully understood with reference to FIG. 5, is to electronically shift the phase of the zero or marker pulse as the pulse is directed to the automatic synchronization logic 56. The shifting of the zero pulse to the automatic position synchronization logic 56 will enable the system to provide and maintain a specific preset phase off-set between two of the drives. The automatic position synchronization logic 56 will be operable to maintain the preset phase offset when it synchronizes the drives as it will still synchronize the zero pulses applied to it to an in-phase relationship although one zero pulse will be delayed or shifted by the phase offset circuit 54. However, since one of the pulses applied to it will have been shifted in time, the automatic position synchronization logic will sense coincidence of the zero pulses applied thereto when the preset phase is maintained.

Referring to FIG. 5, the zero pulse from the single tooth encoder 48 of drive 10 is applied on line 58 to the phase offset circuit 54. The zero pulse applied on line 58 actuates a single shot 300 which establishes a high signal on its output terminal 302. The high output of the single shot 300 is directed along line 304 to set flip flop 308 and along line 306 to preset the number "N" into the programable divider 310. The number N, which is indicative of the desired phase offset, is set into the pre-programable divider 310 by means of a thumb-wheel switch 312. Setting of flip flop 308 effects a high output on line 316 to prime the AND gate 314. A frequency is directed along line 318 through a divider 320 where it is modified to a Frequency $F_1'$ and through the now primed AND gate 314 to the programable divider 310. The frequency $F_1$ is the frequency from the reference frequency generator 18.

The programable divider 310 is a counter which is adapted to have the number N as set by the thumbwheel switch 312 stored therein. Upon the application of a pulse along line 306 to the preset terminal of the programable divider 310, the number N is stored in the counter. The application of the pulse train having a frequency $F_1'$ to the AND gate 314 will apply a pulse train to the down-count terminal 322 of the programmable divider 310. The counter 310 will then count down for N at a rate equaled to the frequency of the pulse train $F_1'$ until zero is reached. The next down pulse applied to terminal 322 will cause the counter 310 to issue a borrow-out pulse on the output terminal 324 thereof. The borrow-out will be directed along line 326 to activate single shot 330. Activation of the single shot 330 will apply a zero pulse on the output line 60 which is connected to the automatic position synchronization logic 56. The zero pulse from single slot 330 will also be directed along the line 332 to the reset terminal of the flip flop 308 thereby resetting the flip flop. Resetting of flip flop 308 will cause AND gate 314 to be blocked to thereby stop the counting of the programable divider 310. The above sequence will then be repeated for each zero pulse directed along line 58. It can be seen that as the zero pulses are directed to the input line 58 of the phase offset circuit 54, they will be delayed a predetermined time determined by the number programmed in the programable divider 310. The zero pulses will then be delayed and directed along the output line 60 to the automatic position synchronization logic 56. Thus, the zero pulse will be delayed a predetermined amout of time prior to the automatic position synchronization logic 56 sensing the zero pulse and a predetermined phase offset between the controlled velocity drives 10 and 11 will result.

The frequency $F_1'$ applied to the counter 310 will be a constant frequency which will count down the counter 310 at a constant rate from the number N set therein. Thus, by controlling the number N, the time it takes the counter 310 to count down to zero will be controllable and the phase offset will be controlled thereby. Since the automatic position synchronization logic 56 senses only the zero pulses, regardless of whether they are delayed, the phase offset circuitry 54 will establish a delayed zero pulse which the automatic position synchronization logic 56 will utilize to phase lock the drives. The automatic position synchronization logic 56 will act to position the drives so that the zero pulses from each drive are coincident. However, since one of the zero pulses may be delayed by the phase offset circuit 54, the automatic position synchronization logic 56 will position the drives so that the zero pulse from one of the drives which has been delayed by the phase offset circuitry 54 will be coincident with the zero pulse from the other of the drives which has not been delayed. Accordingly, since the one zero pulse has been delayed, the automatic position synchronization logic 56 will position the drives so that a predetermined phase offset will be maintained. This is in contrast to the automatic position synchronization logic 56 maintaining a zero phase offset if the phase offset circuitry 54 is not utilized.

The thumb-wheel switch 312 with which the number N is programmed into the programable divider 310 may be a binary coded decimal switch which may be calibrated for the desired degrees shift per digit set in the counter 310 by adjusting the frequency $F_1'$ which is the output of the divider 320. This will set the minimum increment by which the output may be phase shifted with each pulse of the pulse train $F_1'$ representing the minimum switching increment. By changing the frequency $F_1'$ the degree change between marker pulses can be controlled. For example, if we have a 60-tooth gear and a frequency $F_1'$ then each pulse of $F_1'$ that the zero pulse is delayed could represent a 6° movement of the gear or a 6° phase offset. By doubling the reference frequency in the divider 320 a frequency $F_1'$ can be established wherein each pulse of $F_1'$ would represent a 3° per pulse delay of the zero pulse. Thus, the phase offset in the phase offset circuitry 54 could be changed from a 6° minimum to a minimum 3° increment by doubling the frequency $F_1'$. However, the actual phase offset of the drive will be limited to the resolution of the pulse pickup 17.

From the foregoing it should be apparent that a new and improved control system for controlling a plurality of controlled velocity drives has been provided. The control system will be operable to jog one of the drives relative to the other of the drives to maintain a predetermined phase relationship between the drives. The jogging could be done manually or automatically. The automatic phase jogging is accomplished by an automatic position synchronization logic circuitry which senses the relative positions of the drives and locks them into a predetermined in-phase relationship. A phase offset circuit has been provided to allow the automatic synchronization logic to maintain a phase relationship other than an in-phase relationship between the drives.

What we claim is:

1. A control for at least first and second drives which drive first and second driven loads, respectively, comprising generating means for generating a reference pulse train wherein each pulse is indicative of a desired incremental movement of the first and second loads and the frequency of the reference pulses is indicative of a desired velocity of the first and second loads, first and second sensing means associated with said first and second driven loads, respectively, for sensing actual incremental movement and actual velocity of the associated load and each of which establishes a second pulse train wherein each incremental pulse is indicative of an actual incremental movement of the associated load and the frequency of the pulses is indicative of the actual velocity of the associated load, first and second summing means associated with said first and second loads, respectively, for summing pulses of the reference pulse train and pulses of the associated second pulse train for generating a position error signal indicative of the positional error between the actual incremental position of the associated laod, first and second velocity control means associated with said first and second loads, respectively, and each of which is responsive to the associated error signal for varying the velocity of the associated load to drive the associated loads substantially at the desired velocity, third and fourth sensing means associated with said first and second loads, respectively, for sensing an actual postion of the associated load and establishing third and fourth signals, respectively, indicative of the actual position of the associated load, and synchronizing means responsive to said third and fourth signals for determining the actual position of one of the associated loads relative to the actual position of another of the associated loads.

2. A control for at least first and second drives as defined in claim 1 wherein said synchronizing means includes synchronization logic means for establishing an output pulse train wherein the number of pulses in said output pulse train in indicative of the magnitude of the phase difference between said first and second loads.

3. A control for at least first and second drives as defined in claim 2 further including phase jogging means responsive to said output pulse train for blocking the application of a predetermined number of pulses to one of said summing means to thereby shift the phase of said first driven load relative to said second driven load to establish a predetermined phase relationship between said first and said second driven loads.

4. A control for at least first and second drives as defined in claim 1 wherein said synchronizing means includes first means operatively associated with said third sensing means for sensing said third signal indicative of said first load being in a predetermied actual position, second means operatively associated with said fourth sensing means for sensing said fourth signal indicative of said second load being in a predetermined actual position and means responsive to said second pulse train associated with said first load for determining the actual position of said first load relative to the actual position of said second load.

5. A control for at least first and second drives as defined in claim 4 wherein said means responsive to said second pulse train includes counter means, said first means operatively associated with said third sensing means includes initializing means for initializing said counter means to enable said counter means to count pulses of said second pulse train associated with said first load when said third signal is sensed thereby and said second means operatively associated with said fourth sensing means includes blocking means for blocking the application of pulses from said second pulse train to said counter means when said fourth signal is sensed thereby, said counter means having a count stored therein when said fourth signal is sensed by said blocking means which is indicative of the phase difference between said first and second loads.

6. A control for at least first and second drives as defined in claim 5 wherein said synchronizing means further includes synchronization logic means responsive to the count stored in said counter means when said fourth signal is sensed by said blocking means, said synchronization logic means establishing an output pulse train wherein the number of pulses in said output train is indicative of the count stored in said counter means and the magnitude of the phase difference between said first and second loads.

7. A control for at least first and second drives as defined in claim 6 further including phase jogging means responsive to said output pulse train for blocking the application of a predetermined number of pulses to one of said summing means to thereby shift the phase of said first driven load relative to said second driven load to establish a predetermined phase relationship between said first and second driven loads.

8. A control for at least first and second drives as defined in claim 1 wherein said synchronizing means includes logic means for determining whether the phase difference between said first and second loads is less than or greater than 180°, and means responsive to said logic means for changing the phase difference between said first and second loads by increasing the velocity of one of the loads relative to the other of the loads to phase lock said first and second loads to a zero degree phase difference if the phase difference determined by said logic means is less than 180°, and phase locking said first and second loads to a phase difference of 360° if the phase difference determined by said logic means is greater than 180°.

9. A control for at least first and second drives as defined in claim 5 wherein said counter means includes an up/down counter having an up-count terminal and a down-count terminal and wherein said synchronizing means further includes logic means reponsive to the count difference between said first and second loads is less than or greater than 180°.

10. A control for at least first and second drives as defined in claim 9 wherein said logic means includes a diode matrix.

11. A control for at least first and second drives as defined in claim 9 wherein said logic means directs said second pulse train to said up-count terminal of said up/down counter until said logic means responsive to the count stored in said counter indicates that the phase difference between said first and second loads is greater than 180° and for directing said second pulse train to said down-count terminal of said up/down counter after a phase difference between said first and second loads greater than 180' is sensed by said logic means.

12. A control for at least first and second drives as defined in claim 11 wherein said logic means responsive to the count stored in said counter is operable when one of said loads leads the other of said loads by less than 180° to increase the velocity of said other load to establish a zero degree phase difference between said one and said other loads and is further operable when said one load leads said other load by greater than 180° to decrease the velocity of said other load to establish a 360° phase difference between said one and said other loads.

13. A control for at least first and second drives as defined in claim 7 wherein said synchronizing means further includes divider means responsive to said second pulse train for effecting periodic actuation of said phase jogging means to bring said first and second loads into phase when a phase difference is sensed by said synchronizing means, said divider means effecting periodic actuation fo said phase jogging means at a frequency which is less than the frequency of said second pulse train to block the application of individual pulses to said summing means at a frequency which is lower than the frequency of said second pulse train.

14. A control for at least first and second drives as defined in claim 3 wherein said synchronizing means includes divider means responsive to said second pulse train for effecting establishment of said output pulse train for actuating said phase jogging means, said divider means effecting establishment of said output pulse train which has a frequency which is less than the frequency of said second pulse train to block the application of individual pulses to said summing means when a phase difference between said first and second loads is sensed.

15. A control for at least first and second drives as defined in claim 3 wherein said synchronizing means includes logic means for determining whether the phase difference between said first and second loads is less than or greater than 180°, and means responsive to said logic means for changing the phases difference between said first and second loads by increasing the velocity of one of the loads relative to the other of the loads to phase lock said first and second loads to a zero degree phase difference if the phase difference determined by said logic means is less than 180°, and phase locking said first and second loads to a phase difference of 360° if the phase difference determined by said logic means is greater than 180°.

16. A control for at least first and second drives as defined in claim 3 wherein said phase jogging means includes input means associated with one of said first and second sensing means for receiving said second pulse train associated with said one sensing means and output means for directing said second pulse train to one of said summing means which is associated with said one sensing means.

17. A control for at least first and second drives as defined in claim 16 wherein said phase jogging means further includes input means associated with said generating means for receiving said reference pulse train and reference output means for directing said reference pulse train to said one summing means.

18. A control for at least first and second drives as defined in claim 3 wherein said phase jogging means further includes input means associated with said generating means for receiving said reference pulse train and reference output means for directing said reference pulse train to said one summing means.

19. A control for at least first and second drives as defined in claim 17 wherein said phase jogging means further includes first logic means for directing pulses from said input means associated with said generating means to said reference output means and second logic means for directing pulses from said input means associated with said one sensing means to said output means, said first logic means being operable to block the application of a pulse from said reference pulse train to said one summing means to phase shift one driven load relative to said other driven load in a first direction and said second logic means being operable to block the application of a pulse from said second pulse train to said one summing means to phase shift said one driven load relative to said other driven load in a second direction, opposite said first direction.

20. A control for at least first and second drives as defined in claim 4 further including phase offset means operatively associated with said synchronizing means for delaying for a predetermined time the passage of one of said third and fourth signals to said synchronizing means, said synchronizing means acting to synchronize said delayed signal and the undelayed signal indicative of the actual position of the associated driven load to establish a predetermined phase offset between said first and second driven loads wherein the magnitude of the phase offset is dependent upon the predetermined time said one signal is delayed.

21. A control for at least first and second drives as defined in claim 9 further including phase offset means operatively associated with said synchronizing means for delaying for a predetermined time the passage of one of said third and fourth signals to said initializing means and said blocking means, respectively, to establish a predetermined phase offset between said first and second driven loads wherein the magnitude of the phase offset is dependent upon the predetermined time said one signal is delayed.

22. A control for at least first and a second drives as defined in claim 21 wherein said phase offset means includes counting means responsive to said one of said third and fourth signals which is to be delayed, said counting means having a preset count therein which is indicative of the time that it is desired to delay said signal, said counting means being operatively connected to said reference pulse train to count down from said preset count at a rate which is dependent upon the frequency of said reference pulse train after said delayed signal is sensed thereby and being operable to pass said delayed signal to said synchronizing means when said counting means counts down to a predetermined number.

23. A control for at least first and second drives, which drive first and second driven loads, respectively, comprising generating means for generating a reference pulse train wherein each incremental pulse is indicative of a desired incremental movement of the first and second loads and the frequency of the reference pulses is indicative of the desired velocity of the first and second loads, first and second sensing means associated with the first and second driven loads, respectively, for sensing actual incremental movement and velocity of the associated load and each of which establishes a second pulse train wherein each incremental pulse is indicative of an actual incremental movement of the associated load and the frequency of the pulses is indicative of the actual velocity of the associated load, first and second summing means associated with the first and second driven loads, respectively, for summing pulses of the reference pulse train and pulses of the associated second pulse train and each of which generates a position error signal indicative of the positional error between the actual incremental movement of the associated load and the desired incremental movement of the associated load, first and second velocity control means associated with the first and second loads, respectively, and responsive to the associated loads associated error signal for varying the velocity of the associated load to drive the associated load substantially at said desired velocity, and phase jogging means for blocking the application of a pulse to at least one of said summing means to shift the phase of one driven load associated with said one digital summing means relative to the other driven load.

24. A control for at least first and second drives as defined in claim 23 wherein said phase jogging means includes input means associated with one of said first and second sensing means for receiving said second pulse train associated with said one sensing means and output means for directing said second pulse train to said one summing means.

25. A control for at least first and second drives as defined in claim 24 wherein said phase jogging means further includes input means associated with said generating means for receiving said reference pulse train and reference output means for directing said reference pulse train to said one summing means.

26. A control for at least first and second drives as defined in claim 23 wherein said phase jogging means further includes input means associated with said generating means for receiving said reference pulse train and reference output means for directing said reference pulse train to said one summing means.

27. A control for at least first and second drives as defined in claim 25 wherein said phase jogging means further includes first logic means for directing pulses from said input means associated with said generating means to said reference output means and second logic means for directing pulses from said input means associated with said one sensing means to said output means, said first logic means being operable to block the application of a pulse from said reference pulse train to said one summing means to phase shift said one driven load relative to said other driven load in a first direction and said second logic means being operable to block the application of a pulse from said second pulse train to said one summing means to phase shift said one driven load relative to said other driven load in a second direction opposite said first direction.

28. A control for at least first and second drives as defined in claim 27 further including synchronizing means for sensing the phase difference between said one and said other driven load, and actuating said phase jogging means to block the application of a predetermined number of pulses to said one summing means to thereby shift the phase of said one driven load relative to said other driven load to establish a predetermined phase relationship between said one and said other driven load.

29. A control for at least first and second drives as defined in claim 27 further including third and fourth sensing means associated with said first and second driven loads, respectively, said third sensing means being operable to sense an actual position of said first driven load and establish a third signal indicative thereof and said fourth sensing means being operable to sense an actual position of said second driven load and being operable to establish a fourth signal indicative thereof.

30. A control for at least first and second drives as defined in claim 29 further including synchronizing means for sensing the phase difference between said one and said other driven load and actuating said phase jogging means to block the application of a predetermined number of pulses to said one summing means to thereby shift the phase of said one driven load relative to said other driven load to establish a predetermined phase relationship between said one and said other driven load.

31. A control for at least first and second drives as defined in claim 30 wherein said synchronizing means includes first means operatively associated with said third sensing means for sensing said third signal indicative of said first load being in a predetermined actual position, second means operatively associated with said fourth sensing means for sensing said fourth signal indicative of said second load being in a predetermined actual position and means responsive to said second pulse train associated with said first load.

32. A control for at least first and second drives as defined in claim 31 wherein said synchronizing means further includes counter means operatively associated with said second pulse train associated with said first load, initializing means operatively associated with said third signal for initializing said counter means to enable said counter means to count pulses of said second pulse train associated with said first load when said third signal is sensed thereby and blocking means operatively associated with said fourth signal for blocking said counter means to prevent said counter means from counting further pulses of said second pulse train associated with said first load when said fourth signal is sensed thereby, said counter means having a count stored therein when said fourth signal is sensed by said blocking means which is indicative of the phase difference between said first and second loads.

33. A control for at least first and second drives as defined in claim 32 wherein said counter means is an up/down counter having and up-count terminal and a downcount terminal and wherein said synchronizing means further includes means responsive to the count stored in said counter for determining whether the phase difference between said first and second loads is less than or greater than 180°.

34. A control for at least first and second drives as defined in claim 33 wherein said logic means includes a diode matrix.

35. A control for at least first and second drives as defined in claim 33 wherein said synchronizing means further includes logic means for directing said second pulse train to said up-count terminal of said up/down counter until said means responsive to the count stored in the counter indicates that the phase difference between said first and second loads is greater than 180° and for directing said second pulse train to said downcount terminal of said up/down counter after a phase difference of between said first and second loads greater than 180° is sensed by said means responsive to the count stored in the counter.

36. A control for at least first and second drives as defined in claim 35 wherein said logic means is operable when said first load leads said second load by less than 180° to jog said second load forward to bring said first and second loads into phase, and is further operable when said first load leads said second load by greater than 180° to jog said second load backwards to establish a 360° phase difference between said first and second loads.

37. A control for at least first and second drives as defined in claim 28 wherein said synchronizing means includes means for sensing when the phase difference between said first and second driven loads is greater than 180° and logic means for actuating said phase jogging means to phase shift the second load forward relative to the first load when the phase difference between said first and second loads is less than 180° to establish an inphase relationship between said first and second loads and for phase shifting the second load backwards relative to said first load when the phase difference between said first and second loads is greater than 180° to establish a phase relationship between said first and second loads which is 360° apart.

38. A control for at least first and second drives as defined in claim 28 wherein said synchronizing means includes divider means responsive to said second pulse train for effecting periodic actuation of said phase jogging means at a frequency which is less than the frequency of said second pulse train to block the application of individual pulses to said summing means at a frequency which is lower than the frequency of said second pulse train.

39. A control for at least first and second drives as defined in claim 35 wherein said synchronizing means includes divider means responsive to said second pulse train for effecting periodic actuation of said phase jogging means at a frequency which is less than the frequency of said second pulse train to block the application of individual pulses to said digital summing means at a rate which is lower than the frequency of said second pulse train.

40. A control for at least first and second drives as defined in claim 32 wherein said synchronizing means further includes gate means having a first input operatively associated with said third sensing means for receiving said third signal, second input means operatively associated with said fourth sensing means for receiving said fourth signal and output means for establishing an output signal indicative of an in phase condition of said first and second loads when said third and fourth signals are indicative of said first and second drives having an inphase condition.

41. A control for at least first and second drives as defined in claim 30 further including phase offset means operatively associated with said synchronizing means for delaying for a predetermined time the passage of one of said third and fourth signals to said synchronizing means, said synchronizing means acting to synchronize said delayed signal and the undelayed signal indicative of the actual position of the associated driven load to establish a predetermined phase offset between said first and second driven loads wherein the magnitude of the phase offset is dependent on the predetermined time said one signal is delayed.

42. A control for at least first and second drives as defined in claim 27 wherein said synchronizing means includes logic means for determining whether the phase difference between said first and second loads is less than or greater than 180°, and means responsive to said logic means for changing the phase difference between said first and second loads by increasing the velocity of one of the loads relative to the other of the loads to phase lock said first and second loads to a zero degree phase difference if the phase difference determined by said logic means is less than 180°, and phase locking said first and second loads to a phase differenct of 360° if the phase difference determined by said logic means is greater than 180°.

43. A control for at least first and second drives, which drives first and second driven loads, respectively, comprising generating means for generating a reference pulse train wherein each incremental pulse is indicative of a desired incremental movement of the first and second loads, and the frequency of the reference pulses is indicative of the desired velocity of the first and second loads, first and second sensing means associated with the first and second driven loads, respectively, for sensing actual incremental movement and velocity of the associated load and each of which establishes a second pulse train wherein each incremental pulse is indicative of an actual incremental movement of the associated load and the frequency of the pulses is indicative of the actual velocity of the associated load, first and second digital summing means associated with the first and second driven loads, respectively, for summing pulses of the reference pulse train and pulses of the associated second pulse train and each of which generates a position error signal indicative of the positional error between the actual incremental movement of the associated load and the desired incremental movement of the associated load, third and fourth sensing means associated with said first and second loads, respectively, for sensing an actual position of the associated load and establishing third and fourth signals, respectively, indicative of the actual position of the associated load, first and second velocity control means associated with the first and second loads, respectively, and responsive to the associated loads associated error signal for varying the velocity of the associated load to drive the associated loads substantially at said desired velocity, synchronizing means responsive to said third and fourth signals for determining the actual position of one of the associated loads relative to the actual position of another of the associated loads, and phase jogging means for blocking the application of a pulse to at least one of said digital summing means to shift the phase of one driven load associated with said one digital summing means relative to the other driven load.

44. A control for at least first and second drives as defined in claim 43 wherein said synchronizing means includes first means operatively associated with said third signal for sensing said third signal indicative of said first load being in a predetermined actual position, second means operatively associated with said fourth sensing means for sensing said fourth signal indicative of said second load being in a predetermined actual position and counter means operatively associated with said second pulse train associated with said first load, said first means operatively associated with said third sensing means initializing said counter means to enable said counter means to count pulses of said second pulse train associated with said first load when said third signal is sensed thereby, said second means operatively associated with said fourth sensing means blocking said counter means to prevent said counter means from counting further pulses of said second pulse train associated with said first load when said fourth signal is sensed thereby, said counter means having a count stored therein when said fourth signal is sensed by said second means which is indicative of the phase difference between said first and second loads.

45. A control for at least first and second drives as defined in claim 44 further including phase offset means for delaying for a predetermined time the passage of one of said third and fourth signals to said first and second means, respectively, said synchronizing means acting to synchronize said delayed signal and the undelayed signal indicative of the actual position of the associated load to establish a predetermined phase offset between said first and second driven loads wherein the magnitude of the phase offset is dependent on the predetermined time said one signal is delayed.

46. A control for at least first and second drives as defined in claim 43 wherein said synchronizing means includes logic means for determining whether the phase difference between said first and second loads is greater than or less than 180° and means responsive to said logic means for changing the phase difference of said first and second loads by increasing the velocity of one of the loads relative to the other load to establish a zero phase difference between said one and said other load if the phase difference sensed by said logic means is less than 180° and for establishing a 360° phase difference between said one and said other load if the phase difference sensed by said logic means is greater than 180°.

47. A control for at least first and second drives as defined in claim 45 wherein said synchronizing means includes logic means for determining whether the phase difference between said first and second loads is greater than or less than 180° and means responsive to said logic means for changing the phase difference of said first and second loads by increasing the velocity of one of the loads relative to the other load to establish a zero phase difference between said one and said other load if the phase difference sensed by said logic means is less than 180° and for establishing a 360° phase difference between said one and said other load if the phase difference sensed by said logic means is greater than 180°.

48. A control for at least first and second drives as defined in claim 1 wherein said synchronizing means includes first means operatively associated with said third sensing means for sensing said third signal indicative of said first load being in a predetermined actual position, second means operatively associated with said fourth sensing means for sensing said fourth signal indicative of said second load being in a predetermined actual position and means responsive to said reference pulse train for determining the actual position of said first load relative to the actual position of said second load.

49. A control for at least first and second drives as defined in claim 30 wherein said synchronizing means includes first means operatively associated with said third sensing means for sensing said third signal indicative of said first load being in a predetermined actual position, second means operatively associated with said fourth sensing means for sensing said fourth signal indicative of said second load being in a predetermined actual position and means responsive to said reference pulse train.

50. A control for at least first and second drives as defined in claim 43 wherein said synchronizing means includes first means operatively associated with said third signal for sensing said third signal indicative of said first load being in a predetermined actual position, second means operatively associated with said fourth sensing means for sensing said fourth signal indicative of said second load being in a predetermined actual position and counter means operatively associated with said reference pulse train, said first means operatively associated with said third sensing means initializing said counter means to enable said counter means to count pulses of said reference pulse train when said third signal is sensed thereby, said second means operatively associated with said fourth sensing means blocking said counter means to prevent said counter means from counting further pulses of said reference pulse train when said fourth signal is sensed thereby, said counter means having a count stored therein when said fourth signal is sensed by said second means which is indicative of the phase difference between said first and second loads.

51. A control for at least first and second drives which drive first and second driven loads, respectively, comprising first velocity control means for controlling the velocity of the first drive, first sensing means associated with said first driven load for sensing the actual incremental movement and actual velocity of the first driven load and establishing a first pulse train wherein each incremental pulse is indicative of an actual incremental movement of the first driven load and a desired incremental movement of said second driven load and the frequency of the pulses is indicative of the actual velocity of the first driven load and the desired velocity of the second driven load, second sensing means associated with said second driven load for sensing the actual incremental movement and actual velocity of the second driven load and establishing a second pulse train wherein each incremental pulse is indicative of an actual movement of the second driven load and the frequency of the pulses is indicative of the actual velocity of the second driven load, summing means associated with said second load for summing pulses of said first pulse train and pulses of said second pulse train for generating a position error signal indicative of the positional error between the actual incremental position of the second load and the desired incremental position of the second load, second velocity control means associated with said second load and responsive to the position error signal for varying the velocity of the second load to drive the second load substantially at the desired velocity, third and fourth sensing means associated with said first and second loads, respectively, for sensing an actual position of the associated load and establishing third and fourth signals, respectively, indicative of the actual position of the associated load, and synchronizing means responsive to said third and fourth signals for determining the actual position of said second driven load relative to the actual position of said first driven load.

52. A control for at least first and second drives as defined in claim 51 wherein said synchronizing means includes synchronization logic means for establishing an output pulse train wherein the number of pulses in said output pulse train is indicative of the magnitude of the phase difference between said first and second loads.

53. A control for at least first and second drives as defined in claim 52 further including phase jogging means responsive to said output pulse train for blocking the application of a predetermined number of pulses to said summing means to thereby shift the phase of said second driven load relative to said first driven load to establish a predetermined phase relationship between said first and second driven loads.

54. A control for at least first and second drives which drive first and second driven loads, respectively, comprising first velocity control means for controlling the velocity of the first drive, first sensing means associated with said first driven load for sensing the actual incremental movement and actual velocity of the first driven load and establishing a first pulse train wherein each incremental pulse is indicative of an actual incremental movement of the first driven load and a desired incremental movement of the second driven load and the frequency of the pulses is indicative of the actual velocity of the first driven load and the desired velocity of the second driven load, second sensing means associated with said second driven load for sensing the actual incremental movement and actual velocity of the second driven load and establishing a second pulse train wherein each incremental pulse is indicative of an actual incremental movement of the second driven load and the frequency of the pulse is indicative of the actual velocity of the second driven load, summing means associated with said second load for summing pulses of said first pulse train and pulses of said second pulse train for generating a position error signal indicative of the positional error between the actual incremental position of the second load and the desired incremental position of the second load, second velocity control means associated with said second load and responsive to the position error signal for varying the velocity of the second load to drive the second load substantially at the desired velocity and phase jogging means for blocking the application of a pulse to said summing means to shift the phase of said second driven load relative to said first driven load.

55. A control for at least first and second drives as defined in claim 54 wherein said phase jogging means includes input means associated with said second sensing means for receiving said second pulse train and output means for directing said second pulse train to said summing means.

56. A control for at least first and second drives as defined in claim 55 wherein said phase jogging means further includes input means associated with said first sensing means for receiving said first pulse train and second output means for directing said first pulse train to said summing means.

57. A control for at least first and second drives as defined in claim 56 wherein said phase jogging means further includes first logic means for directing pulses from said input means associated with said first sensing means to said second output means and second logic means for directing pulses from said input means associated with said first sensing means to said output means, said first logic means being operable to block the application of a pulse from said first pulse train to said summing means to phase shift the first driven load relative to the second driven load in a first direction and said second logic means being operable to block the application of a pulse from said second pulse train to said summing means to phase shift said first driven load relative to said second driven load in a second direction opposite said first direction.

58. A control for at least first and second drives as defined in claim 57 further including synchronizing means for sensing the phase difference between said first and second driven loads and actuating said phase jogging means to block the application of a predetermined number of pulses to said summing means to thereby shift the phase of said first driven load relative to said second driven load to establish a predetermined phase relationship between said one and said other driven load.

59. A control for at least first and second drives which drives first and second loads, respectively, at substantially the same velocity comprising first sensing means for sensing an actual position of the first load and establishing a first signal indicative thereof, second sensing means for sensing an actual position of said second load and establishing a second signal indicative thereof, synchronization means responsive to said first and second signals for synchronizing said first and second loads, said synchronization means including means for sensing the distance one of said loads moves between the establishment of said first signal and the establishment of said second signal and third sensing means associated with one of said loads for establishing a pulse train wherein each pulse is indicative of an actual incremental movement of said one load and the frequency of the pulses is indicative of the actual velocity of said one load and wherein said means for sensing the distance that one load moves includes counter means responsive to said pulse train.

60. A control for at least first and second drives as defined in claim 59 wherein said means for sensing the distance said one load moves further includes first logic means responsive to one of said first and second sensing means for initializing said counter means in response to said one sensing means sensing an actual position of its associated load, and second logic means responsive to the other of said first and second sensing means for blocking said counter means in response to said other sensing means sensing an actual position of its associated load, said counter means counting the pulses of said pulse train after being initialized and having a count stored therein when being blocked indicative of the phase difference between said first and second loads.

61. A control for at least first and second drives as defined in claim 60 wherein said synchronization means further includes means for establishing an output pulse train wherein the number of pulses in said output pulse train is indicative of the magnitude of the phase difference between said first and second loads and the count stored in said counter means when said counter means is blocked by said second logic means.

62. A control for at least first and second drives as defined in claim 61 further including phase jogging means responsive to said output pulse train for shifting the phase of one of said loads relative to said other load to establish a predetermined phase relationship between said first and second driven loads.

* * * * *

UNITED STATES PATENT OFFICE
CERTIFICATE OF CORRECTION

Patent No. 3,906,327          Dated September 16, 1975

Inventor(s) Gerald F. O'Callaghan; Donald D. Woelz

It is certified that error appears in the above-identified patent and that said Letters Patent are hereby corrected as shown below:

Column 2, line 8, "for" should read -- of --.

Column 7, line 8, "log" should read -- jog --.

Column 9, line 3, After "74" insert-- to block NAND Gate 74 --.

line 50, "10" should read -- 100 --.

Column 13, line 5, "pulses" should read -- pulse --.

Column 15, line 4, "lip" should read -- flip --.

Column 19, line 66, "laod" should read -- load --.

Signed and Sealed this twenty-seventh Day of January 1976

[SEAL]

Attest:

RUTH C. MASON
*Attesting Officer*

C. MARSHALL DANN
*Commissioner of Patents and Trademarks*